US012786651B2

(12) United States Patent
Chan et al.

(10) Patent No.: US 12,786,651 B2
(45) Date of Patent: Nov. 3, 2026

(54) AUDIO PROCESSING SYSTEM AND AUDIO PROCESSING METHOD

(71) Applicant: REALTEK SEMICONDUCTOR CORP., Hsinchu (TW)

(72) Inventors: Chun-Chieh Chan, Hsinchu (TW); Hung-Shao Chen, Hsinchu (TW); Tzu-Hsin Fan, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 148 days.

(21) Appl. No.: 18/964,920

(22) Filed: Dec. 2, 2024

(65) Prior Publication Data

US 2025/0350896 A1 Nov. 13, 2025

(30) Foreign Application Priority Data

May 10, 2024 (TW) ................................ 113117293

(51) Int. Cl.
*H04S 7/00* (2006.01)
*H04S 3/00* (2006.01)

(52) U.S. Cl.
CPC ................ *H04S 7/00* (2013.01); *H04S 3/008* (2013.01); *H04S 2400/01* (2013.01); *H04S 2400/13* (2013.01); *H04S 2400/15* (2013.01)

(58) Field of Classification Search
CPC ............. H04S 2400/01; H04S 2400/03; H04S 2400/13; H04S 2400/15; H04S 3/008;
(Continued)

(56) References Cited

U.S. PATENT DOCUMENTS 7,136,712 B2 * 11/2006 Mizumura ................ H04S 1/00 386/355
2001/0020193 A1 * 9/2001 Teramachi ....... G11B 20/10527 381/56

(Continued)

OTHER PUBLICATIONS

Judit Barsony, "Easy EDID Creator Advanced EDID Editor", Lightware Visual Engineering LLC., Jul. 14, 2021 (Jul. 14, 2021), https://lightware.com/pub/media/lightware/filedownloader/file/Application-Note/EDID_Editor_Application_Notes_v2.1_1.pdf.

*Primary Examiner* — Lun-See Lao
(74) *Attorney, Agent, or Firm* — Li & Cai Intellectual Property (USA) Office

(57) ABSTRACT

An audio processing system and an audio processing method are provided. The audio processing system includes a receiving circuit and a processing circuit. The receiving circuit is configured to adjust original extended display capability identification data for generating optimized extended display capability identification data. The audio source device reads the optimized extended display capability identification data. The audio source device responds to the receiving circuit with a first multi-channel signal according to the optimized extended display capability identification data, and a quantity of sound channels of the first multi-channel signal is greater than a maximum quantity of sound channels supported by the audio processing system. The processing circuit is configured to convert the first multi-channel signal into a second multi-channel signal, and a quantity of sound channels of the second multi-channel signal is different from that of the first multi-channel signal.

14 Claims, 6 Drawing Sheets

(58) Field of Classification Search
CPC .... H04S 7/00; H04S 7/30; G06F 2203/04803; G06F 3/011; G06F 3/04815; G06F 3/04817; G06F 3/04842; G06F 3/0485; G06F 3/017; G06F 3/167; G06F 3/14; G06F 16/332; G06F 16/334; G06F 16/338; G06F 16/34; G06F 3/1446; G06F 21/10; G06F 21/608; G06F 3/01; G06F 3/0346; G06F 3/0484
USPC ............... 381/303, 119; 386/96–107; 700/94
See application file for complete search history.

(56) References Cited

U.S. PATENT DOCUMENTS

2008/0143317 A1* 6/2008 Dave ...................... G01R 1/025
324/76.41
2020/0351465 A1* 11/2020 Wolff ...................... G06F 3/162

* cited by examiner

AUDIO PROCESSING SYSTEM AND AUDIO PROCESSING METHOD

CROSS-REFERENCE TO RELATED PATENT APPLICATION

This application claims the benefit of priority to Taiwan Patent Application No. 113117293, filed on May 10, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an audio processing system and an audio processing method, and more particularly to an audio processing system and an audio processing method that can flexibly adjust audio specifications.

BACKGROUND OF THE DISCLOSURE

With the advancement of technology, people's reliance on high-quality audio and video has gradually increased. However, since the strength of mainstream display devices is still their image processing capabilities, additional support from other advanced audio processing equipment (such as a home theater set, a sound bar, or an amplifier) is often required to upgrade the sound quality experience.

However, the above-mentioned advanced audio processing equipment is expensive. Furthermore, due to the popularity of laptops, mobile devices, and streaming platforms, most people are accustomed to using mobile phones or tablets as audio and video sources, and external display devices are used as a receiving end of audio and video signals, so as to play videos or music. Currently, the mainstream streaming platforms can support multi-channel audio output to improve the listening experience of a user. However, due to the limitation on capabilities of the receiving end, the upgraded listening experience cannot be enjoyed in most situations.

SUMMARY OF THE DISCLOSURE

In response to the above-referenced technical inadequacy, the present disclosure provides an audio processing system and an audio processing method.

In order to solve the above-mentioned problem, one of the technical aspects adopted by the present disclosure is to provide an audio processing device system. The audio processing system is adapted to an audio source device. The audio processing system includes a receiving circuit and a processing circuit. The receiving circuit is connected to the audio source device and the processing circuit, and the receiving circuit is configured to adjust original extended display capability identification data for generating optimized extended display capability identification data. The audio source device reads the optimized extended display capability identification data. The audio source device responds to the receiving circuit with a first multi-channel signal according to the optimized extended display capability identification data, and a quantity of sound channels of the first multi-channel signal is more than a maximum quantity of sound channels supported by the audio processing system. The processing circuit is configured to convert the first multi-channel signal into a second multi-channel signal, and a quantity of sound channels of the second multi-channel signal is different from that of the first multi-channel signal.

In order to solve the above-mentioned problem, another one of the technical aspects adopted by the present disclosure is to provide an audio processing method. The audio processing method is executed by an audio processing system, and includes a receiving circuit and a processing circuit. The audio processing method includes: adjusting, by the receiving circuit, original extended display capability identification data to generate optimized extended display capability identification data; reading the optimized extended display capability identification data by an audio source device; responding to the receiving circuit with a first multi-channel signal by the audio source device according to the optimized extended display capability identification data; receiving the first multi-channel signal by the receiving circuit, in which a quantity of sound channels of the first multi-channel signal is more than a maximum quantity of sound channels supported by the audio processing system; and converting the first multi-channel signal into a second multi-channel signal by the processing circuit, in which a quantity of sound channels of the second multi-channel signal is different from the quantity of the sound channels of the first multi-channel signal.

Therefore, in the audio processing system and the audio processing method provided by the present disclosure, the audio processing system is different from an expensive audio processing hardware (such as a digital signal processor or an equalizer) for being capable of providing listening experience similar to that of the equalizer through simple audio processing algorithms. Since the downmix technology of current streaming platforms prioritizes compatibility with most display devices on the market, the downmix technology is stereotyped and cannot flexibly adjust an emphasis part of an audio signal according to preferences or ideas of a user. However, the audio processing method allows an individual sound channel of the audio signal to be flexibly optimized in response to different scenes or different audio-visual contents, thereby achieving the function of being similar to the equalizer.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
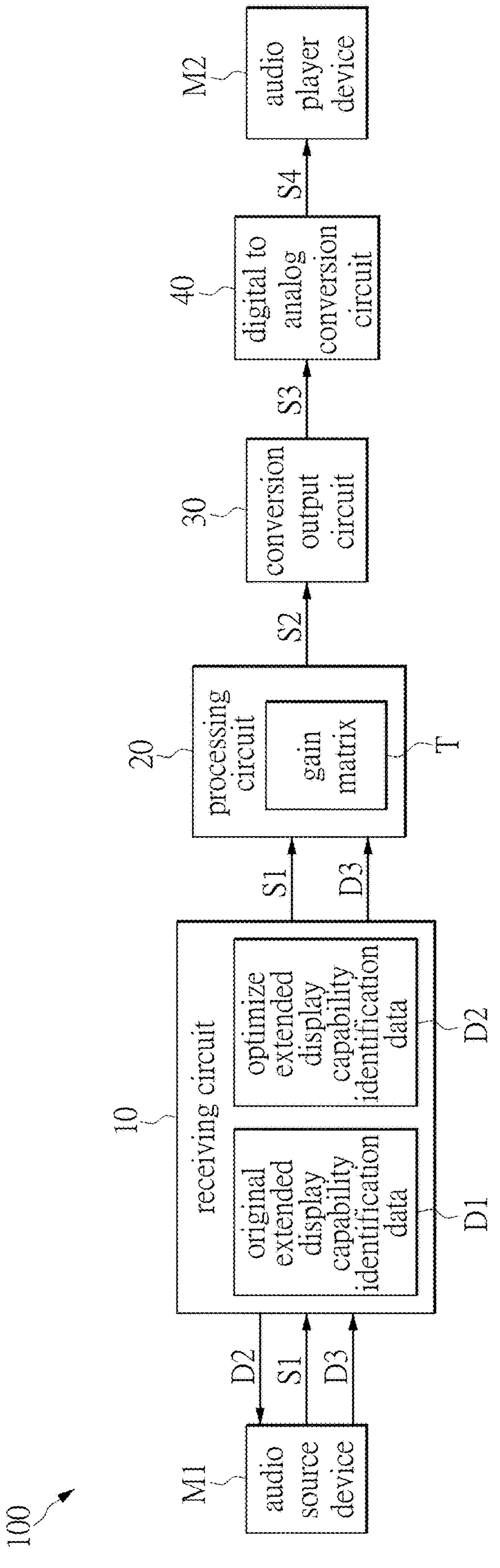
FIG. 1 is a schematic diagram of an audio processing system according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

FIG. 1 is a schematic diagram of an audio processing system according to a first embodiment of the present disclosure. Referring to FIG. 1, an audio processing system 100 includes a receiving circuit 10, a processing circuit 20, a conversion output circuit 30, and a digital-to-analog conversion circuit 40. The receiving circuit 10 is connected to an audio source device M1, the processing circuit 20 is connected to the receiving circuit 10 and the conversion output circuit 30, and the digital-to-analog conversion circuit 40 is connected to the conversion output circuit 30.

The receiving circuit 10 is configured to adjust original extended display capability identification data D1 stored in an internal memory for generating optimized extended display capability identification data D2, and the audio source device M1 reads the optimized extended display capability identification data D2.

The extended display capability identification data mentioned above is only an example, and the present disclosure is not limited thereto. Other data that can be used to declare capabilities of a receiving end is also applicable to the present disclosure, such as Display ID.

Specifically, extended display identification data (EDID) is an audio-visual standard data format developed by the American Video Electronics Standards Association. In detail, EDID is an identification of an audio-visual playback device, and its content includes, for example, a name, a product serial number, an image resolution, and an audio specification of the audio-visual playback device. The purpose of EDID is to announce the audio-visual support capability of the audio-visual playback device, and to ensure that an audio-visual source can send a correct audio and video format to the audio-visual playback device according to the EDID of the audio-visual playback device after a computer or a set-top box is connected to the audio-visual playback device. In this way, situations where the audio-visual playback device cannot display audio-visual data or a display ratio is abnormal can be avoided.

The extended display capability identification data is stored in the internal memory of the audio-visual playback device, and can be transmitted through some audio-visual transmission interfaces that are commonly seen on the market, such as DisplayPort (DP), a high-definition multimedia interface (HDMI), and a universal serial bus (USB) Type C.

After the audio source device M1 reads the optimized extended display capability identification data D2 of the receiving circuit 10, the audio source device M1 responds to the receiving circuit 10 with a first multi-channel signal S1 and audio auxiliary data D3 according to the optimized extended display capability identification data D2. The audio auxiliary data D3 includes, for example, audio sampling format data, channel location data, audio metadata, audio information frame, audio content protection data, and multi-stream audio data.

When the audio processing system 100 handshakes with the audio source device M1, the audio source device M1 responds to the audio processing system 100 with the audio specification that is higher than a highest audio specification supported by the audio processing system 100.

For example, the highest audio specification supported by the audio processing system 100 is four-sound channel, and the receiving circuit 10 modifies the highest audio specification to six-sound channel, so as to generate the optimized extended display capability identification data D2. After the audio source device M1 reads the optimized extended display capability identification data D2, the audio source device M1 responds to the audio processing system 100 with the first multi-channel signal S1 according to the optimized extended display capability identification data D2, and the audio specification of the first multi-channel signal S1 is the six-sound channel. It should be noted that the audio specification of the first multi-channel signal S1 mentioned above is only an example, and the present disclosure is not limited thereto.

An audio specification that is higher than audio receiving capability and audio playing capability of the audio processing system 100 is declared to the audio source device M1 by the receiving circuit 10, so as to induce the audio source device M1 to output high-standard audio and audio auxiliary data. When receiving the high-standard audio, the receiving circuit 10 can obtain higher content density information, thereby providing more audio extraction information or audio conversion information to a subsequent processing circuit and improving the efficiencies of audio extraction and audio conversion.

The receiving circuit 10 transmits the first multi-channel signal S1 and the audio auxiliary data D3 to the processing circuit 20. The processing circuit 20 is configured to convert the first multi-channel signal S1 into a second multi-channel signal S2, and a quantity of sound channels of the second multi-channel signal S2 is different from that of the first multi-channel signal S1.

The processing circuit 20 is, for example, a microcontroller unit, and an internal memory of the microcontroller unit stores a time domain audio processing algorithm. Compared to a digital signal processor and an equalizer, the microcontroller unit has the advantage of being low-priced, but can achieve the function of being similar to the digital signal processor and the equalizer.

The processing circuit 20 is configured to execute the time domain audio processing algorithm for modulating the first multi-channel signal S1. Specifically, the time domain audio processing algorithm of the processing circuit 20 determines the number of columns and rows of a gain matrix T according to the quantity of the sound channels of the first multi-channel signal S1 of the processing circuit 20 and the quantity of the sound channels of the second multi-channel signal S2 outputted by the processing circuit 20. The number of the columns of the gain matrix T is equal to the quantity of the sound channels of the second multi-channel signal S2, and the number of the rows of the gain matrix T is equal to the quantity of the sound channels of the first multi-channel signal S1.

The above-mentioned gain matrix T is only an example of a time domain audio processing method, and the present disclosure is not limited thereto. Any time domain audio processing method can be applied in the present disclosure.

The first multi-channel signal S1 is multiplied by the gain matrix T to generate the second multi-channel signal S2. The gain matrix T includes a plurality of different gain parameters. The time domain audio processing algorithm can modulate each of the gain parameters, such that a weight of each of the sound channels of the first multi-channel signal S1 is individually modulated.

For example, the first multi-channel signal S1 includes a first sound channel FL, a second sound channel FC, a third sound channel FR, a fourth sound channel LS, a fifth sound channel RS, and a sixth sound channel LFE.

When a user needs to convert the six-sound channel into two-sound channel, the first multi-channel signal S1 must be multiplied by a matrix with 2 columns and 6 rows, such as the gain matrix T shown in the following formula:

$$T = \begin{bmatrix} 1.0 & -3\text{ dB} & 0 & -3\text{ dB} & 0 & 0 \\ 0 & -3\text{ dB} & 1.0 & 0 & -3\text{ dB} & 0 \end{bmatrix}.$$

The first multi-channel signal S1 is multiplied by the gain matrix T to generate the second multi-channel signal S2 having the first sound channel L and the second sound channel R (as shown in the following formula).

$$\begin{bmatrix} L \\ R \end{bmatrix} = \begin{bmatrix} 1.0 & -3\text{ dB} & 0 & -3\text{ dB} & 0 & 0 \\ 0 & -3\text{ dB} & 1.0 & 0 & -3\text{ dB} & 0 \end{bmatrix} \times \begin{bmatrix} FL \\ FC \\ FR \\ LS \\ RS \\ LFE \end{bmatrix}.$$

Two gain parameters of the gain matrix T allocated to the sixth sound channel LFE are 0, so as to eliminate a volume of the sixth sound channel LFE. Another two gain parameters of the gain matrix T allocated to the second sound channel FC are negative values, so as to weaken a volume of the second sound channel FC.

For example, the first multi-channel signal S1 includes the first sound channel FL, the second sound channel FC, the third sound channel FR, the fourth sound channel LS, the fifth sound channel RS, and the sixth sound channel LFE. When the user needs to convert the six-sound channel into the four-sound channel, the respective numbers of the columns and the rows of another gain matrix T must be designed to be 4 columns and 6 rows, such as the gain matrix T shown in the following formula.

$$T = \begin{bmatrix} 1.0 & 3\text{ dB} & 1 & -3\text{ dB} & 0 & 1 \\ 1.0 & 0 & 0 & 0 & 0 & 0 \\ 1.0 & 3\text{ dB} & 1 & -3\text{ dB} & 0 & 1 \\ 1.0 & 0 & 0 & 0 & 0 & 1 \end{bmatrix}.$$

In addition, the first multi-channel signal S1 is multiplied by the gain matrix T to generate the second multi-channel signal S2 having the four-sound channel. The second multi-channel signal S2 includes the first sound channel L1, the second sound channel R1, the third sound channels L2, and the fourth sound channel R2, which are shown in the following formula:

$$\begin{bmatrix} L1 \\ R1 \\ L2 \\ R2 \end{bmatrix} = \begin{bmatrix} 1.0 & 3\text{ dB} & 1 & -3\text{ dB} & 0 & 1 \\ 1.0 & 1 & 0 & 1 & 0 & 0 \\ 1.0 & 3\text{ dB} & 1 & -3\text{ dB} & 0 & 1 \\ 1.0 & 1 & 0 & 1 & 0 & 1 \end{bmatrix} \times \begin{bmatrix} FL \\ FC \\ FR \\ LS \\ RS \\ LFE \end{bmatrix}.$$

Four gain parameters of the gain matrix T allocated to the fifth sound channel audio RS are all 0, so as to eliminate a volume of the fifth sound channel RS. Two gain parameters of the gain matrix T allocated to the second sound channel audio FC are positive values, so as to strengthen the volume of the second sound channel FC. Another two gain parameters of the gain matrix T allocated to the fourth sound channel LS are negative values, so as to weaken a volume of the fourth sound channel LS.

The quantity of the sound channels of the first multi-channel signal S1, the quantity of the sound channels of the second multi-channel signal S2, and the gain matrix T are only examples, and the present disclosure is not limited thereto.

In addition to audio signal downmixing, different modulation processing can also be dynamically performed on different sound channels according to usage scenarios, user preferences, or different audio signals provided by the audio source device. For example, a weight of each of sound channels of an audio signal can be enhanced or weakened to exert an effect similar to an equalizer. For example, if a video music provided by an audio source device is dynamic and has a strong rhythm, a weight of a high-frequency sound channel of the video music will be enhanced. For example, when the user wants to learn the English pronunciation of an actor through a video, he needs to prevent environmental sounds from affecting the speaking voice of the actor. As such, the user should strengthen a weight of a sound channel that plays the human voice and weaken a weight of a sound channel that plays the environmental sound.

The conversion output circuit 30 is connected to the processing circuit 20 and the digital-to-analog conversion circuit 40. The conversion output circuit 30 is used to convert the first digital audio format of the second multi-channel signal S2 into a second digital audio format to generate a third multi-channel signal S3, and transmits the third multi-channel signal S3 to the digital-to-analog conversion circuit 40. A quantity of sound channels of the third multi-channel signal S3 is the same as that of the second multi-channel signal S2. The digital-to-analog conversion circuit 40 is used to connect at least one audio playback device M2. The digital-to-analog conversion circuit 40 converts a digital format of the third multi-channel signal S3 into an analog format of a fourth multi-channel signal S4, and transmits the fourth multi-channel signal S4 to the at least one audio playback device M2.

For example, the conversion output circuit 30 first packages a two-channel audio signal of the processing circuit 20 into an I2S, SPDIF, or PCM format, and then transmits the two-channel audio signal having the I2S, SPDIF, or PCM format to the digital-to-analog conversion circuit 40. The digital-to-analog conversion circuit 40 can be connected to the at least one audio playback device M2, such as a headphone, a two-channel speaker, or both. The digital-to-analog conversion circuit 40 converts the digital format of the two-channel audio signal into the analog format, and the at least one audio playback device. M2 plays the two-channel audio signal.

In other embodiments, the audio processing system 100 may further include a control interface, and the control interface is connected to the receiving circuit 10 and the processing circuit 20. The original extended display capability identification data D1 can be modified through the control interface to generate the optimized extended display capability identification data D2, and the number of the columns, the number of the rows, and each of the gain parameters of the gain matrix T can be modified through the control interface.

For example, the control interface can be a physical keyboard, a virtual keyboard, or an application installed on a mobile device. The user modulates each of the gain parameters of the gain matrix T through the control interface according to different types of audio sources (such as a game, a theater, and a speech), thereby enhancing or weakening an audio characteristic corresponding to each of the sound channels. In this way, the effect of improving the listening experience at a limited cost can be achieved.

Figure 2:
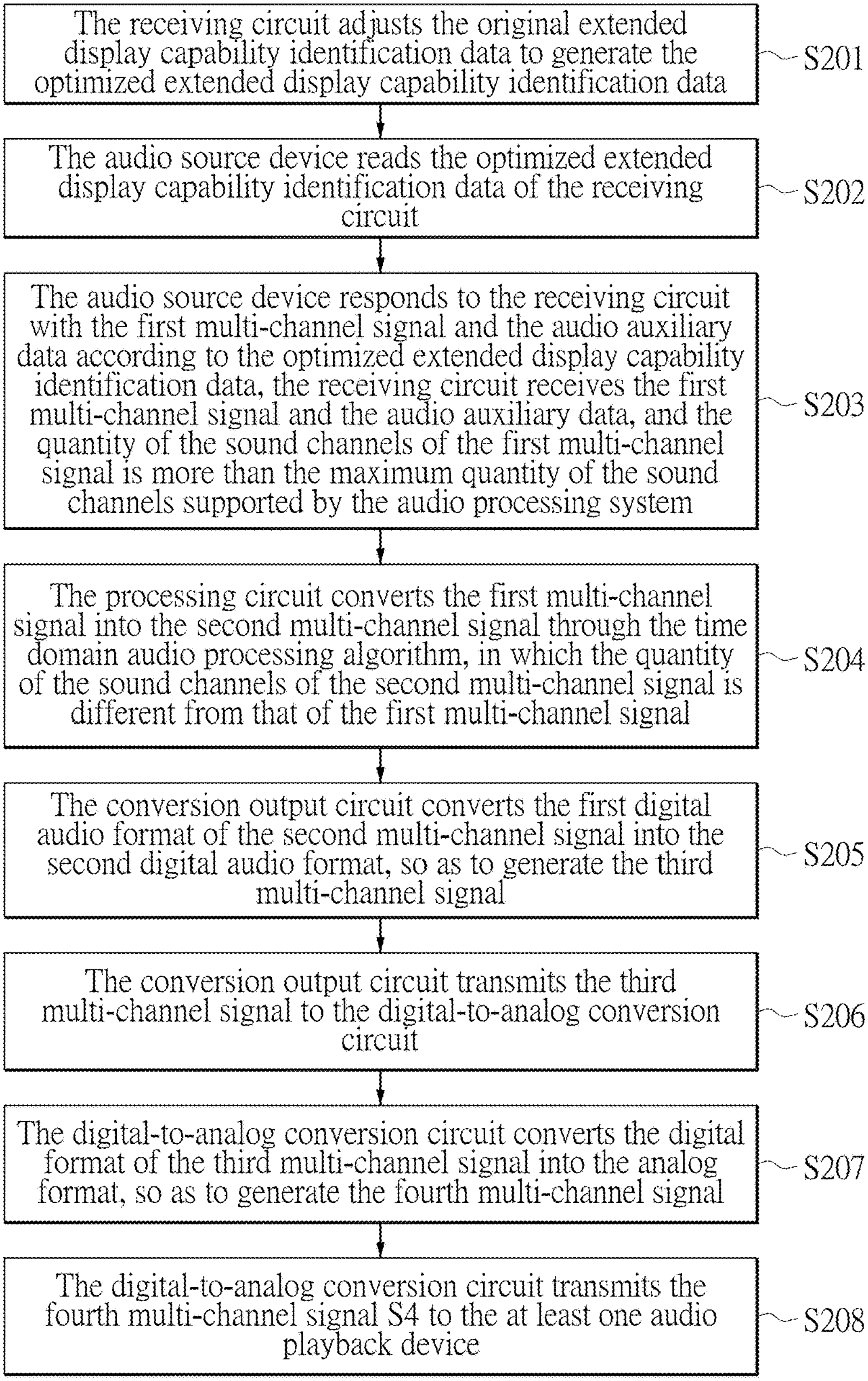
FIG. 2 is a flowchart of an audio processing method according to the first embodiment of the present disclosure.

FIG. 2 is a flowchart of an audio processing method according to the first embodiment of the present disclosure. Referring to FIG. 2, in step S201, the receiving circuit 10 adjusts the original extended display capability identification data D1 to generate the optimized extended display capability identification data D2.

Specifically, the original extended display capability identification data D1 includes a maximum quantity of sound channels supported by the audio processing system 100. The receiving circuit 10 modifies the maximum quantity of the sound channels to generate an optimized quantity of the sound channels, and the optimized quantity of the sound channels is greater than the maximum quantity of the sound channels.

In step S202, the audio source device M1 reads the optimized extended display capability identification data D2 of the receiving circuit 10.

In step S203, the audio source device M1 responds to the receiving circuit 10 with the first multi-channel signal S1 and the audio auxiliary data D3 according to the optimized extended display capability identification data D2, and the receiving circuit 10 receives the first multi-channel signal S1 and the audio auxiliary data D3. The quantity of the sound channels of the first multi-channel signal S1 is more than the maximum quantity of the sound channels supported by the audio processing system 100.

Specifically, audio receiving capability and audio playing capability that are higher than those supported by the audio processing system 100 are announced to the audio source device M1 by the receiving circuit 10, so as to induce the audio source device M1 to output corresponding high-standard audio data and audio auxiliary data.

In step S204, the processing circuit 20 converts the first multi-channel signal S1 into the second multi-channel signal S2 through the time domain audio processing algorithm, in which the quantity of the sound channels of the second multi-channel signal S2 is different from that of the first multi-channel signal S1.

Specifically, the time domain audio processing algorithm designs the gain matrix T according to the quantity of the sound channels of the first multi-channel signal S1 inputted to the processing circuit 20 and the quantity of the sound channels of the second multi-channel signal S2 outputted by the processing circuit 20. The number of the columns of the gain matrix T is equal to the quantity of the sound channels of the second multi-channel signal S2, and the number of the rows of the gain matrix T is equal to the quantity of the sound channels of the first multi-channel signal S1. The sound channels of the first multi-channel signal S1 are modulated through the gain parameters of the gain matrix T.

In step S205, the conversion output circuit 30 converts the first digital audio format of the second multi-channel signal S2 into the second digital audio format, so as to generate the third multi-channel signal S3.

Specifically, the first digital audio format is, for example, DP or HDMI, and the second digital audio format is I2S, SPDIF, or PCM.

In step S206, the conversion output circuit 30 transmits the third multi-channel signal S3 to the digital-to-analog conversion circuit 40.

In step S207, the digital-to-analog conversion circuit 40 converts the digital format of the third multi-channel signal S3 into the analog format, so as to generate the fourth multi-channel signal S4.

In step S208, the digital-to-analog conversion circuit 40 transmits the fourth multi-channel signal S4 to the at least one audio playback device M2.

Figure 3:
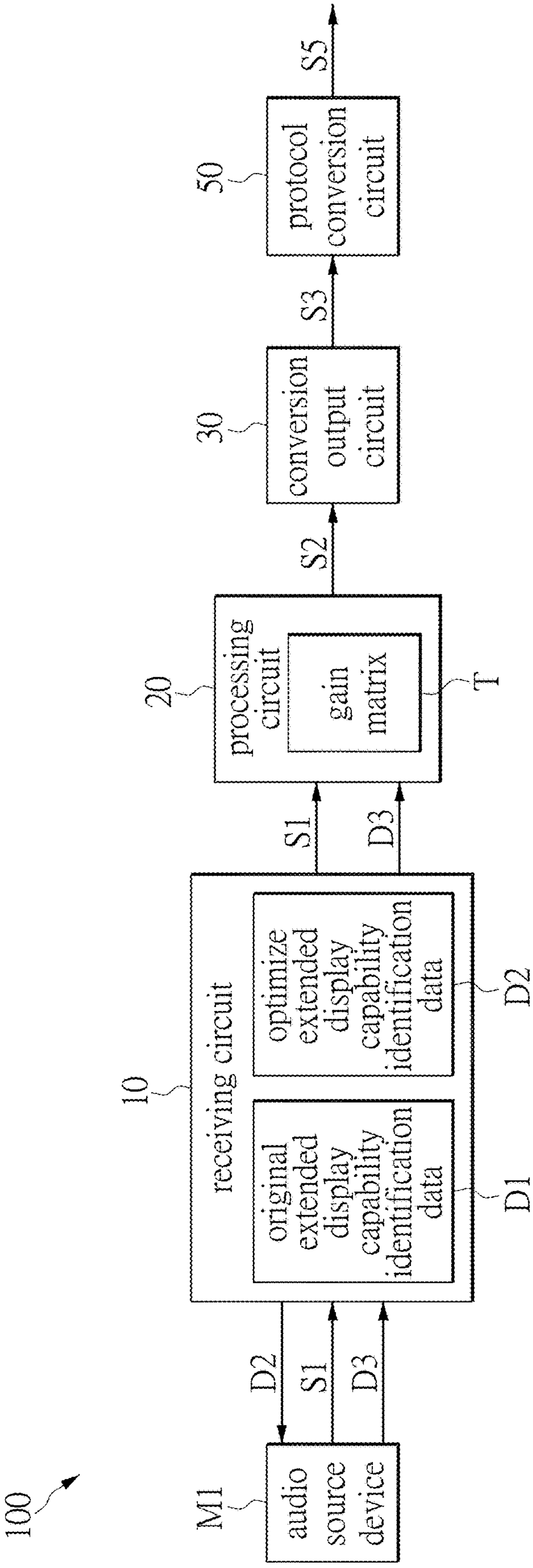
FIG. 3 is a schematic diagram of the audio processing system according to a second embodiment of the present disclosure.

FIG. 3 is a schematic diagram of the audio processing system according to a second embodiment of the present disclosure. A comparison is made between the audio processing system of FIG. 3 and the audio processing system of FIG. 1, and their differences are described as follows. The audio processing system 100 of FIG. 3 further includes a protocol conversion circuit 50, and the conversion output circuit 30 is connected to the protocol conversion circuit 50 and the processing circuit 20. The conversion output circuit 30 is used to transmit the third multi-channel signal S3 to the protocol conversion circuit 50. The protocol conversion circuit 50 is used to convert the second digital audio format of the third multi-channel signal S3 into a third digital audio format for generating a fifth multi-channel signal S5, in which a quantity of sound channels of the fifth multi-channel signal S5 is the same as that of the third multi-channel signal S3. The protocol conversion circuit 50 outputs the fifth multi-channel signal S5.

For example, the conversion output circuit 30 first packages the two-channel audio signal of the processing circuit 20 into the I2S, SPDIF, or PCM format, and then transmits the two-channel audio signal having the I2S, SPDIF, or PCM format to the protocol conversion circuit 50. The protocol conversion circuit 50 is, for example, an audio-visual conversion interface having a HDMI, DP, USB Type C, MIPI, or ASA format. The protocol conversion circuit 50 converts the two-channel audio signal having the I2S, SPDIF, or PCM format into the two-channel audio signal having the HDMI, DP, USB Type C, MIPI, or ASA format, and outputs the two-channel audio signal having the HDMI, DP, USB Type C, MIPI, or ASA format.

Figure 4:
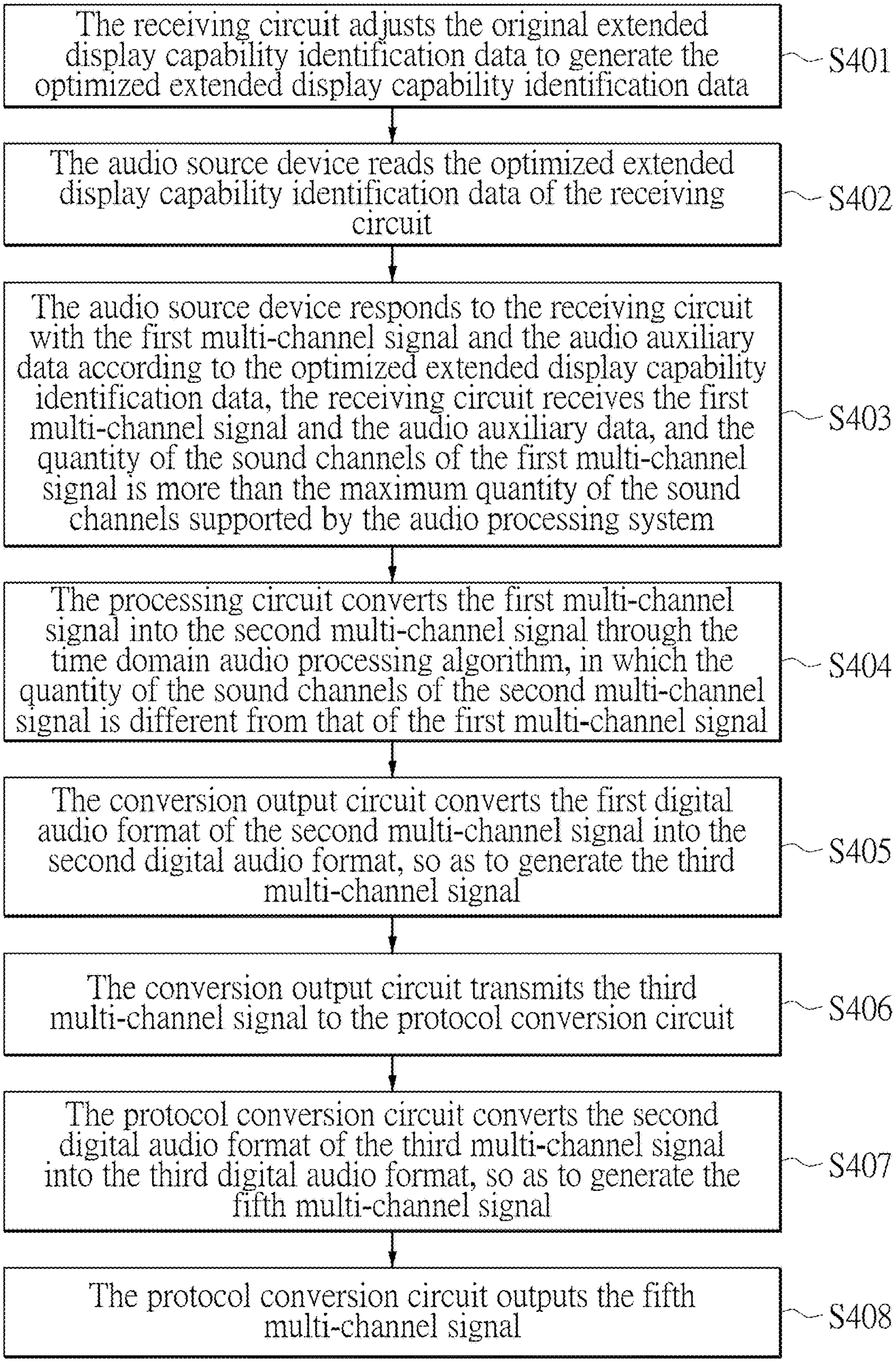
FIG. 4 is a flowchart of the audio processing method according to the second embodiment of the present disclosure.

FIG. 4 is a flowchart of the audio processing method according to the second embodiment of the present disclosure. A comparison is made between the audio processing method of FIG. 4 and the audio processing method of FIG. 2, and steps S401 to S405 of FIG. 4 correspond to steps S201 to S205 of FIG. 2. Differences between FIG. 4 and FIG. 2 are described as follows. In step S406, the conversion output circuit 30 transmits the third multi-channel signal S3 to the protocol conversion circuit 50.

In step S407, the protocol conversion circuit 50 converts the second digital audio format of the third multi-channel signal S3 into the third digital audio format, so as to generate the fifth multi-channel signal S5.

Specifically, the second digital audio format of the third multi-channel signal S3 is, for example, I2S, SPDIF, or PCM, and the third digital audio format of the fifth multi-channel signal S5 is HDMI, DP, USB Type C, MIPI, or ASA.

In step S408, the protocol conversion circuit 50 outputs the fifth multi-channel signal S5.

Figure 5:
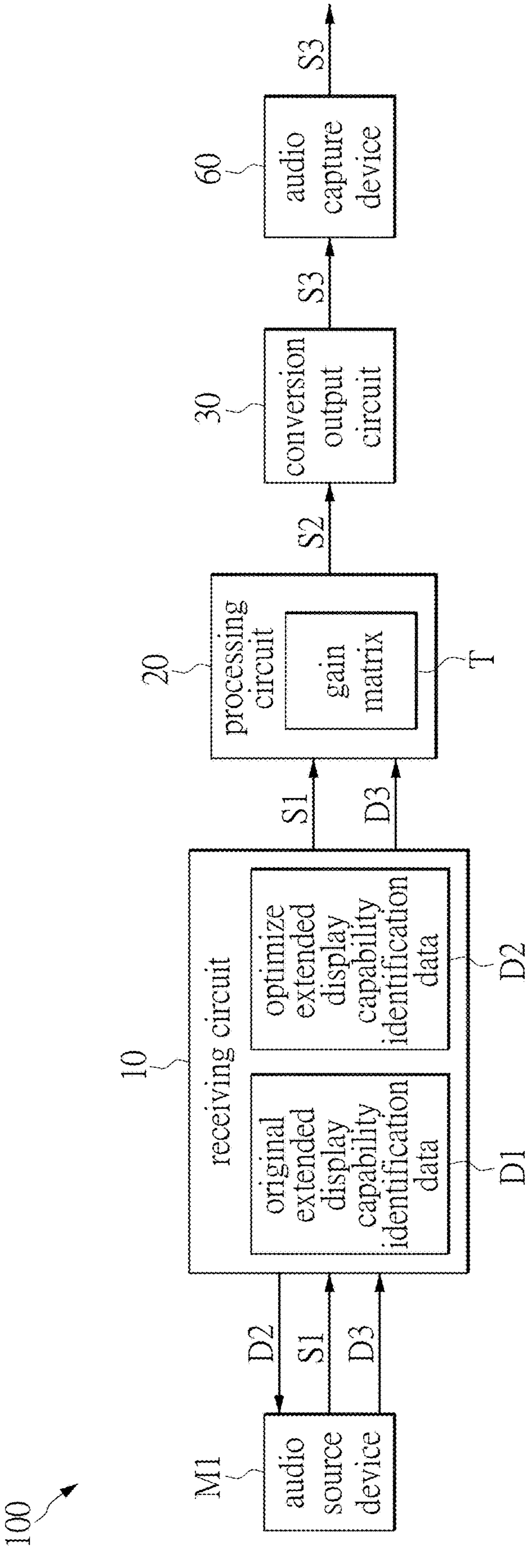
FIG. 5 is a schematic diagram of the audio processing system according to a third embodiment of the present disclosure.

FIG. 5 is a schematic diagram of the audio processing system according to a third embodiment of the present disclosure. A comparison is made between the audio processing system of FIG. 5 and the audio processing system of FIG. 1, and their differences are described as follows. The audio processing system 100 of FIG. 5 further includes an audio capture device 60, and the conversion output circuit 30 is connected to the processing circuit 20 and the audio capture device 60. The conversion output circuit 30 is used to transmit the third multi-channel signal S3 to the audio capture device 60. The audio capture device 60 outputs the third multi-channel signal S3.

For example, the conversion output circuit 30 first packages the two-channel audio signal of the processing circuit 20 into the I2S, SPDIF, or PCM format, and then transmits the two-channel audio signal having the I2S, SPDIF, or PCM format to the audio capture device 60. The audio capture device 60 captures and directly outputs the two-channel audio signal having the I2S, SPDIF, or PCM format.

Figure 6:
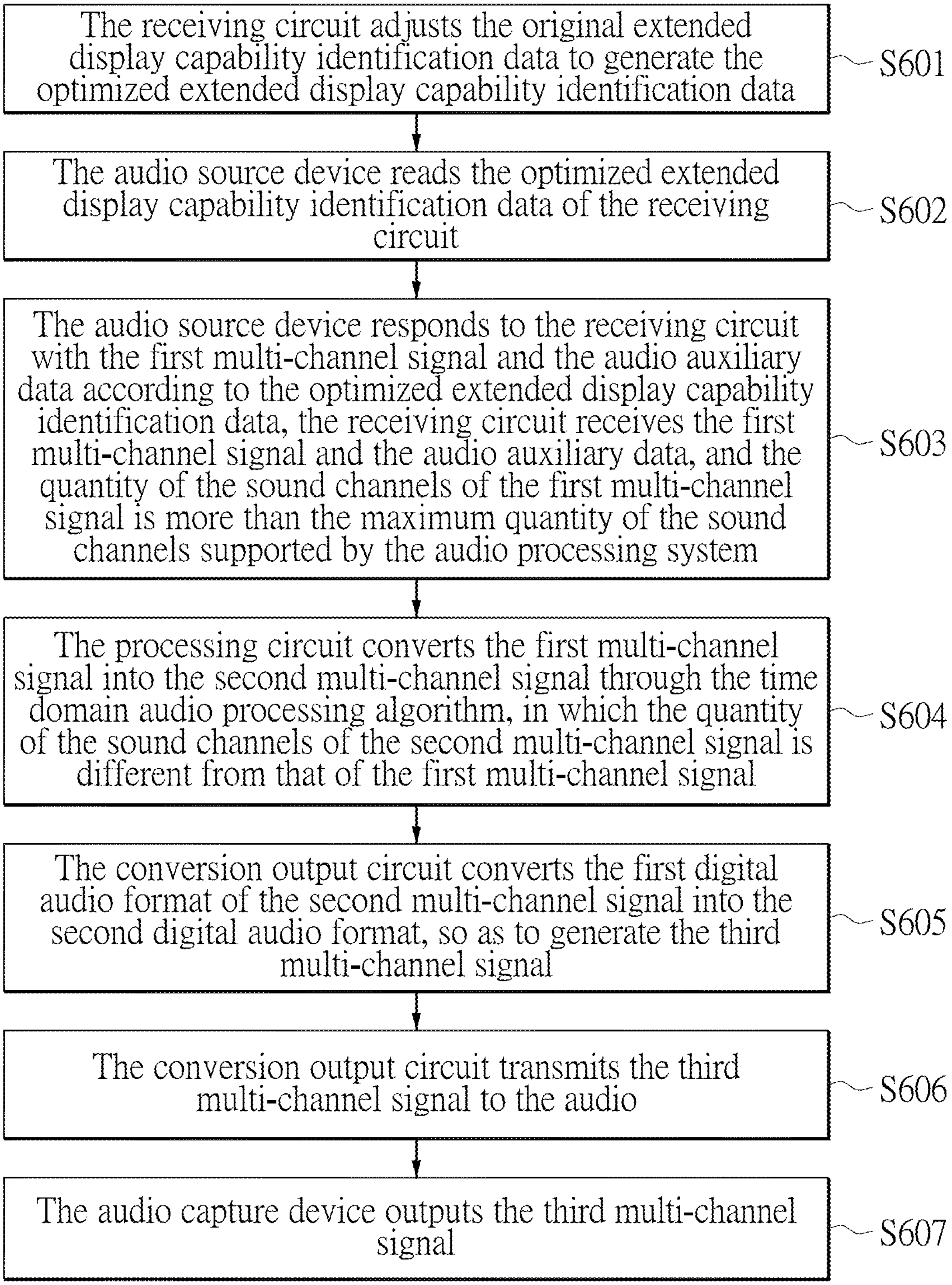
FIG. 6 is a flowchart of the audio processing method according to the third embodiment of the present disclosure.

FIG. 6 is a flowchart of the audio processing method according to the third embodiment of the present disclosure. A comparison is made between the audio processing method of FIG. 6 and the audio processing method of FIG. 2, and steps S601 to S605 of FIG. 6 correspond to steps S201 to S205 of FIG. 2. Differences between FIG. 6 and FIG. 2 are described as follows. In step S606, the conversion output circuit 30 transmits the third multi-channel signal S3 to the audio capture device 60. Specifically, the audio format of the third multi-channel signal S3 is, for example, I2S, SPDIF, or PCM.

In step S607, the audio capture device 60 outputs the third multi-channel signal S3.

BENEFICIAL EFFECTS OF THE EMBODIMENTS

In conclusion, in the audio processing system and the audio processing method provided by the present disclosure, the audio processing system is different from an expensive audio processing hardware (such as a digital signal processor or an equalizer) for being capable of providing listening experience similar to that of the equalizer through simple audio processing algorithms. Since the downmix technology of current streaming platforms prioritizes compatibility with most display devices on the market, the downmix technology is stereotyped and cannot flexibly adjust an emphasis part of an audio signal according to preferences or ideas of a user. However, the audio processing method allows an individual sound channel of the audio signal to be flexibly optimized in response to different scenes or different audio-visual contents, thereby achieving the function of being similar to the equalizer.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An audio processing system, which is adapted to an audio source device, the audio processing system comprising:

a receiving circuit connected to the audio source device; and a processing circuit connected to the receiving circuit;

wherein the receiving circuit is configured to adjust original extended display capability identification data for generating optimized extended display capability identification data, and the audio source device reads the optimized extended display capability identification data;

wherein the audio source device responds to the receiving circuit with a first multi-channel signal according to the optimized extended display capability identification data, and a quantity of sound channels of the first multi-channel signal is more than a maximum quantity of sound channels supported by the audio processing system;

wherein the processing circuit is configured to convert the first multi-channel signal into a second multi-channel signal, and a quantity of sound channels of the second multi-channel signal is different from the quantity of the sound channels of the first multi-channel signal.

2. The audio processing system according to claim 1, wherein the audio source device further responds to the receiving circuit with audio auxiliary data, and the audio auxiliary data includes audio sampling format data, channel location data, and audio metadata.

3. The audio processing system according to claim 1, wherein the processing circuit is configured to process the first multi-channel signal with a gain matrix, so as to generate the second multi-channel signal.

4. The audio processing system according to claim 3, wherein the gain matrix includes a plurality of different gain parameters, and the gain parameters are respectively allocated to the sound channels of the first multi-channel signal.

5. The audio processing system according to claim 1, further comprising a conversion output circuit and a digital-to-analog conversion circuit, wherein the conversion output circuit is connected to the processing circuit and the digital-to-analog conversion circuit, the conversion output circuit is configured to convert a first audio format of the second multi-channel signal into a second audio format for generating a third multi-channel signal, and the conversion output circuit transmits the third multi-channel signal to the digital-to-analog conversion circuit.

6. The audio processing system according to claim 1, further comprising a conversion output circuit and a protocol conversion circuit, wherein the conversion output circuit is connected to the protocol conversion circuit and the processing circuit, the conversion output circuit is configured to convert a first audio format of the second multi-channel signal into a second audio format for generating a third multi-channel signal, and the protocol conversion circuit is configured to convert the second audio format of the third multi-channel signal into a third audio format.

7. The audio processing system according to claim 1, further comprising a conversion output circuit and an audio capture device, wherein the conversion output circuit is connected to the processing circuit and the audio capture device, the conversion output circuit is configured to convert a first audio format of the second multi-channel signal into a second audio format for generating a third multi-channel signal, and the conversion output circuit transmits the third multi-channel signal to the audio capture device.

8. An audio processing method, the audio processing method being executed by an audio processing system, the audio processing system including a receiving circuit and a processing circuit, and the audio processing method comprising:

adjusting, by the receiving circuit, original extended display capability identification data to generate optimized extended display capability identification data;

reading the optimized extended display capability identification data by an audio source device;

responding to the receiving circuit with a first multi-channel signal by the audio source device according to the optimized extended display capability identification data;

receiving the first multi-channel signal by the receiving circuit, wherein a quantity of sound channels of the first multi-channel signal is more than a maximum quantity of sound channels supported by the audio processing system; and converting the first multi-channel signal into a second multi-channel signal by the processing circuit, wherein a quantity of sound channels of the second multi-channel signal is different from the quantity of the sound channels of the first multi-channel signal.

9. The audio processing method according to claim 8, further comprising: responding to the receiving circuit with audio auxiliary data by the audio source device according to the optimized extended display capability identification data after the audio source device reads the optimized extended display capability identification data; wherein the audio auxiliary data includes audio sampling format data, channel location data, and audio metadata.

10. The audio processing method according to claim 8, wherein converting the first multi-channel signal into the second multi-channel signal by the processing circuit includes: processing the first multi-channel signal with a gain matrix to generate the second multi-channel signal.

11. The audio processing method according to claim 10, wherein the gain matrix includes a plurality of different gain parameters, and the gain parameters are respectively allocated to the sound channels of the first multi-channel signal.

12. The audio processing method according to claim 8, further comprising: converting, by a conversion output circuit, a first audio format of the second multi-channel signal into a second audio format to generate a third multi-channel signal after the processing circuit converts the first multi-channel signal into the second multi-channel signal; and transmitting the third multi-channel signal to a digital-to-analog conversion circuit by the conversion output circuit.

13. The audio processing method according to claim 8, further comprising: converting, by a conversion output circuit, a first audio format of the second multi-channel signal into a second audio format to generate a third multi-channel signal after the processing circuit converts the first multi-channel signal into the second multi-channel signal; transmitting the third multi-channel signal to a protocol conversion circuit by the conversion output circuit; and converting the second audio format of the third multi-channel signal into a third audio format by the protocol conversion circuit.

14. The audio processing method according to claim 8, further comprising: converting, by a conversion output circuit, a first audio format of the second multi-channel signal into a second audio format to generate a third multi-channel signal after the processing circuit converts the first multi-channel signal into the second multi-channel signal; and transmitting the third multi-channel signal to an audio capture device by the conversion output circuit.

* * * * *